Figure 1:
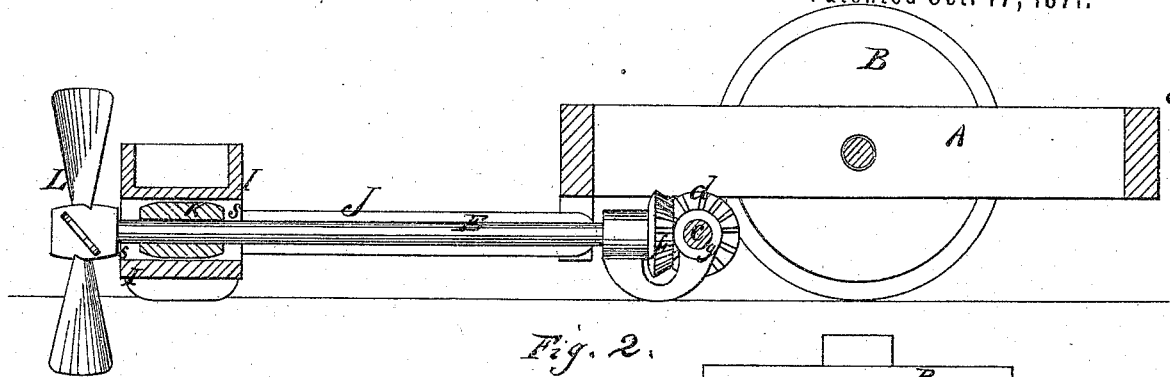
Figure 2:
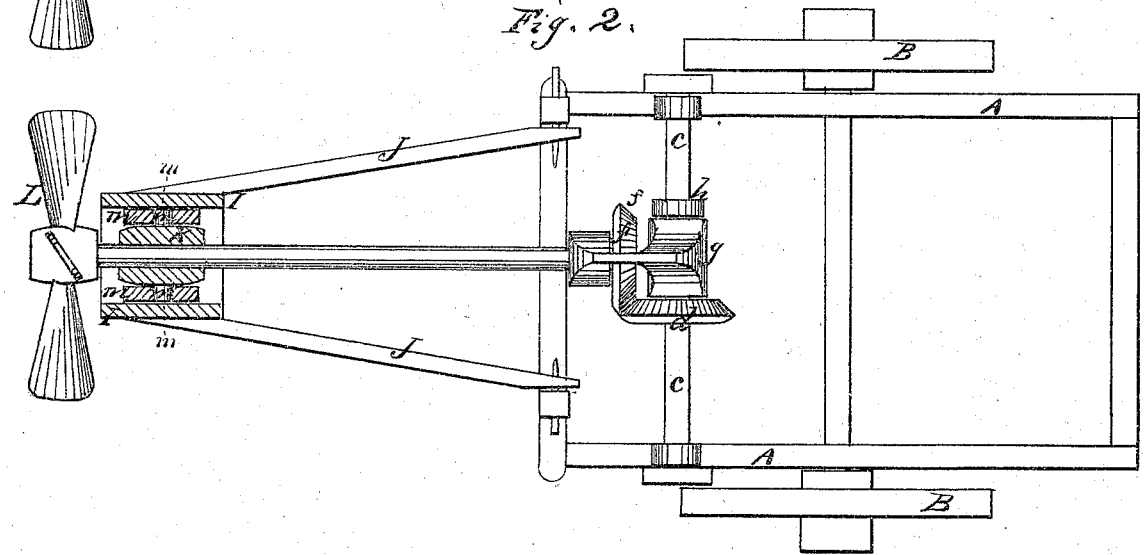
Figure 3:
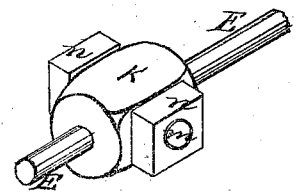

*Oliver Hyde*     *Impt. in Steam Plows.*

No. 120,071.     Patented Oct. 17, 1871.

Witnesses
Geo. H. Strong.
Benjn. E. Fabre.

Inventor.
Oliver Hyde
By his Attys
Knauth & Co.

AM. PHOTO-LITHOGRAPHIC CO. N.Y. (OSBORNE'S PROCESS.)

UNITED STATES PATENT OFFICE.

OLIVER HYDE, OF OAKLAND, CALIFORNIA.

IMPROVEMENT IN STEAM-PLOWS.

Specification forming part of Letters Patent No. 120,071, dated October 17, 1871.

*To all whom it may concern:*

Be it known that I, OLIVER HYDE, of Oakland, county of Alameda, State of California, have invented an Improvement in Steam-Plows; and I do hereby declare the following description and accompanying drawing are sufficient to enable any person skilled in the art or science to which it most nearly appertains to make and use my said invention or improvements without further invention or experiment.

The object of my invention is to so attach and connect the cutters of steam-plows to the frame-work and driving-power of the machine that each cutter will have a movement up and down separate and independent from each of the others while they are all driven from the same shaft. This independent movement of the cutters is necessary in order to permit the machine to plow properly over uneven ground.

In order to explain my invention reference is had to the accompanying drawing forming a part of this specification, in which—

A represents the frame-work of any steam-plow or cultivator, and B the supporting-wheels. The transverse shaft C is here represented as passing across beneath the frame-work of the machine, but from the nature of the invention it will readily be understood that its location is immaterial. A bevel-wheel, *d*, is fixed upon this shaft. The driving-shaft E has fixed at its inner extremity a bevel-wheel, *f*, and outside of this wheel is a transverse sleeve, *g*, which is arranged to slide upon the shaft *c* until the bevel-wheels are in gear, in which position it is secured by a fixed collar, *h*, on its opposite side, thus permitting the shaft E to be turned about the shaft C as a center without disengaging the bevel-gears. A small frame, I, having a square opening, *s*, through it in line with the shaft E is connected with the frame of the machine by hinged side braces J. The rear end of the driving-shaft E passes through a square box, K, which is provided with short trunnions *m*. These trunnions pass through holes in small side pieces or plates *n*, and the entire box with its trunnions and side pieces are placed loosely in the square opening in the frame I. As before stated the rear end of the shaft E passes through this box K, and the cutter L is secured to the outer extremity. By this means I successfully connect and gear the cutters with the machine, so that each one will have a free and independent up-and-down movement for the purpose given above.

Having thus described my invention, what I claim, and desire to secure by Letters Patent as an improvement on my plow patented January 24, 1871, No. 111,212, is—

The frame I, connected with the frame A by means of the hinged arms or braces J, in combination with the box K and driving-shaft E, provided with the bevel-wheel *f* and sleeve *g*, all constructed and arranged substantially as and for the purpose herein described.

In witness that the above-described invention is claimed by me I have hereunto set my hand and seal.

OLIVER HYDE. [L. S.]

Witnesses:
J. L. BOONE,
GEO. H. STRONG.

(114)